H. F. RAWLL.
COUPON BOOK.
APPLICATION FILED JUNE 12, 1918.

1,282,627.

Patented Oct. 22, 1918.
2 SHEETS—SHEET 1.

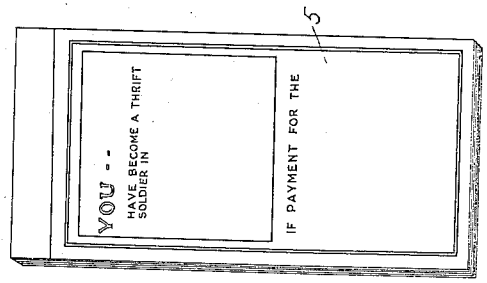

UNITED STATES PATENT OFFICE.

HERBERT F. RAWLL, OF SHORT HILLS, NEW JERSEY, ASSIGNOR TO CHRISTMAS CLUB, A CORPORATION OF NEW YORK.

COUPON-BOOK.

1,282,627.   Specification of Letters Patent.   Patented Oct. 22, 1918.

Application filed June 12, 1918.   Serial No. 239,641.

*To all whom it may concern:*

Be it known that I, HERBERT F. RAWLL, a citizen of the United States, residing in Short Hills, in the county of Essex and State of New Jersey, have made certain new and useful Improvements in Coupon-Books, of which the following is a specification.

My invention relates to a coupon book particularly adapted for use in connection with the current systems for expediting and rendering accurate the keeping account of successive fractional payments on account of a unit sum on the part of numerous subscribers, as for example, in the case of subscriptions to Christmas club, Government loans, and the like. The present invention is designed more particularly to render such methods applicable to a centralized system in which provision is made for payment of any part or parts of any subscription by any subscriber at a number of depositories, all connected by the system to a central organization, office, or clearing house; and the invention consists in a coupon book designed to facilitate the operation of such a centralized system, as will more clearly appear in the following specification, reference being made to the claims for identification of the novel elements and combinations involved.

In the accompanying drawings:

Figure 1 illustrates in perspective a coupon book embodying the invention, and such as was used by associations of banks in the recent Third Liberty Loan.

Fig. 2 is a perspective view of the same, with the front cover open and showing the printing of regulations on the rear of said cover and the form and printing of the sheet, (here forming the first sheet of the coupon book, but not necessarily so placed), which I for convenience will designate the "purchase agreement sheet", although it has a number of functions in the operation of this centralized system which will be presently described.

Fig. 3 is a similar view showing the rear of this purchase agreement sheet and the first of a series of stubs and attached coupons characteristic of systems employed in the Christmas club and like fractional payment plans.

Fig. 4 is a similar view, showing the rear of the last stub and coupon of the series, and the first of a supplemental mailing-direction sheet.

Fig. 5 is a like view, illustrating a supplemental sheet, (which may be the first of a series of supplemental sheets), giving a list of the agencies or depositories forming part of the system and at any one of which payments may be made; also illustrating the front of the rear cover of the coupon book, giving a list of fractional payments to be made, together with the dates when due, etc.

Fig. 6 is a perspective view of the coupon book, looking at the rear of the back cover.

In the operation of subscription and savings plans involving the payment by a number of persons at one place and at like times of equal parts or instalments or fractions of a total or unit obligation or amount, a method commonly used is to furnish to each subscriber or customer at the time of opening the account or beginning of the transaction, a coupon book, usually having a cover or partial cover on which for convenience may be printed the regulations or a description of the method. These systems have, as indicated, been applied to cases where all the payments were to be made by all the subscribers to a single depository, such as a bank receiving Christmas club deposits.

These methods and coupon books have not been, before the present invention, applicable, without modification or addition, to use in obtaining the subscriptions or deposit agreements, and maintaining a complete and accurate account of the transactions in extremely extended operations, such as that of the recent Third Liberty Loan, in which a large number of subscribers were to be provided with a plan, and means for carrying out that plan, of starting their accounts at any one of a large number of agencies, maintaining the subscription by payment at allotted times of fractional parts of the obligation at any one of a number of agencies, keeping a complete account of each transaction in such manner as to protect the subscriber, the payee of individual amounts, the organization controlling the association of agencies, and the individual or corporation, for example the United States Treasury Department, which issues the bond or obligation being subscribed for; and also providing for the due delivery of said bond or obligation, and taking receipt therefor, and the checking up of all of the transactions at all of the associated agencies. Such a system has for a prime object the relief of the individual banks, trust companies, and sub-post-offices acting as local depositories or subscription agencies of all details of bookkeeping and accounting, such simple bookkeeping as is necessary being performed by the central agency or headquarters of the association of depositories or the local agency of the bond obligor, for example the United States Treasury.

The main body of the coupon book which is employed is, or may be, similar to that employed in Christmas club and other partial payment savings plans, and is illustrated in Fig. 3, 1 being the first of a series of sheets bound together in book form and each comprising a coupon 1ª of a stub portion 1ᵇ joined by a perforated or otherwise weakened line 2. The coupon may bear the account number, for example 227, which identifies this particular book with its owner when taken in connection with the items recorded at the time of subscription for the book or bond. The coupons are also numbered consecutively from 1 up, for instance from 1 to 48. The coupon also has printed upon it an amount, for example $1.00, which may be alike on all coupons in one book or may vary in different coupons of the book according to the plan of payment adopted, and usually this printing of the amount is accompanied by a legend such as "Credit account numbered below", to indicate that this amount, when the system is properly followed, is to be credited to the account whose number appears upon the same coupon. A blank space may be provided on the coupon for receiving the imprint of the stamp of a payee, or this stamp may be applied directly over the printing upon the coupon.

The stub may have like or corresponding printed matter identifying it with the coupon, attached to it as to amount of payment, account number and coupon serial number, or any of these identification marks; or it may be entirely blank, or it may, as shown, have in connection with a blank space for the inprinting of the receipt stamp of a payee, words indicating that the applying of such stamp is evidence of receipt of the amount stated on the coupon, as for example the words "When stamped and dated by a duly authorized agent in accordance with the rules and regulations printed in this book, this stamp constitutes a receipt for the amount printed in the attached coupon."

This part of the book does not, separately considered, constitute my invention, and may be varied as desired, so long as it retains such of the elements as above described, as fit it for coöperation with a centralized system to which my invention particularly relates.

There is also associated with this coupon book a table showing the amounts to be paid from time to time, the dates of such payment, usually also the total of deposits to date, and the grand total, as appears at 3, Fig. 5, where the table is shown printed on the inside of the back cover of the book. The cover of the book may have the general directions and other matter printed upon the front page, (4, Fig. 1), and upon the last page, (5, Fig. 6), and on the inside of the front cover may be printed the regulations, as indicated at 7, Fig. 2.

Bound in the book, preferably between the front cover and the first coupon sheet 1, is the purchase agreement sheet 8, comprising a stub portion 9 and a removable section or card 10, united to the stub 9 by a perforated or otherwise weakened portion 11. Upon the removable section 10 is printed a form of subscription agreement setting forth the terms under which the subscriber makes his subscription. A place is provided for the date, the denomination or amount of the obligation is printed, a space is provided for signature and address of the subscriber, and preferably this purchase agreement section or card has printed upon it also the account number, for instance 227, agreeing with the account number of the associated book of coupons. The stub to which this purchase agreement card is attached is printed to indicate that when the card is detached the stub constitutes a receipt for the initial instalment of the purchase price of the bond being purchased, or the initial amount of deposit out of the total agreed upon. The back of the card is preferably printed with a receipt to be signed by the purchaser or deposit, acknowledging the receipt by him of the bond or amount contracted for, as shown at 12, Fig. 3.

Preferably also there is provided a supplemental insert card or sheet, 13, Fig. 4, in rear of the set of coupons and at the back of the book, which has printed upon it directions for delivery of the bond or amount agreed upon otherwise than by direct personal delivery, as for example by registered mail.

There is also provided in the book, preferably by inserting at the end of the book inside of the back cover, one or a series of supplemental sheets, a list, such as is indicated at 14, Fig. 5, of the agencies who will receive partial or fractional payments on the account.

In operating under this plan in obtaining subscriptions for, let us say, the Third Liberty Loan, in which bonds of various denominations were to be issued with as wide a distribution as possible, a central committee of headquarters is established for each city or section, for example the Liberty Loan Association of New York City, being an organization of all the agencies in the section agreeing to operate in accordance with this plan and having direct relation with the Treasury or its agent. This association establishes headquarters for taking care of the accounts and issues the coupon books of the required denominations to its members, and also in this case to the Government agencies authorized to receive subscriptions for example the United States Post Office sub-stations. A complete list of these agencies is printed on each coupon book on sheet or sheets 14.

When a subscriber to a bond, for example a $50.00 bond, goes to one of these agencies, the agency having selected a coupon of the proper denomination, secures the signature of the subscriber to the purchase agreement card which upon being dated is torn out of the book and the book delivered to the subscriber, the subscriber at the same time paying the initial deposit of, in this case, $2.00.

The purchase agreement card may be, but usually is not, stamped by the receiving agency and is mailed by it to the headquarters of the association together with other like cards lifted during the course of the day, coupons representing other payments received, and a check or other remittance for the amount represented by these cards and coupons. The book delivered to the subscriber, with this purchase agreement card removed, is evidence of the starting of his account and the payment of the initial subscription. The receiving agency may stamp upon this book the date of delivery which stamp may be upon any portion of the cover, but this is not usual or necessary.

In the plan of operation which has been followed in practice, a large number of soliciting agents, additional to those listed in the book, have been employed for securing subscriptions, these mere soliciting agents' function being completed when the formalities of subscription, initial payment and delivery of the book are completed, and all subsequent transactions take place with the officially named agencies listed on the book.

The purchase agreement sheet, when properly filled out, the card severed and delivered to headquarters, has a number of functions. The stub, as above stated, forms a receipt to the subscriber for the initial payment. The card contains the subscription contract and the signature of the subscriber thereto. It indicates the account whereby all future payments may be properly identified, as the corresponding coupons come in to headquarters. It affords a receipt for the first payment and has printed upon the back, as at 12, Fig. 3, the form of receipt which is to be signed by the subscriber when the bond is finally delivered to him on the completion of the transaction. It will be seen that when issued by a local agency and delivered to the headquarters of a centralized system, it operates as a notice from the subscriber to the central association that the book of a specific account number has been contracted for and therefore serves as the starting point for the future account.

The account having been started, as above indicated the subscriber from time to time, as instructed by the table of payments, (indicated at 3, Fig. 5), makes payment of the amount called for by successive coupons at any one of the agencies specified in the list printed on sheet or sheets 14, the receiving agency in each case stamping the coupon and its stub, as indicated at 15—15, Fig. 3, with the place and date of payment and the word "Paid", or word or words of like import. The "place" of payment is conveniently given by indicating merely the number of the agency, of the loan association receiving the payment, for example, Liberty Loan Association, New York City, 83,—the number indicating the name and location of the agency as shown in the list of agencies given in the supplemental sheets.

The coupon is then severed and retained by the agency to be delivered with all amounts, coupons, and cards received during the day, to headquarters, and the book bearing upon its stub evidence of this last payment, is returned to the subscriber. This process is continued as long as the subscriber continues to make the payments or until the agreement is completely fulfilled, whereupon the subscriber, in return for the execution of the receipt, (12, Fig. 3), or authorization, (13, Fig. 4), or both, receives delivery of the bond contracted for and the transaction is completed.

The central agency or headquarters, by associating the coupons received from time to time with the proper account number and with the amounts received from the various agencies is able with a minimum of skilled bookkeeping to keep account of all payments received.

A great advantage derived from a centralized system developed by the use of this coupon book, is that the bond obligor, for example the United States Treasury, is put in immediate possession of the funds, without awaiting payment of instalments by individual subscribers, as the bonds represented by the books which are taken by the local associations of banks and trust companies for flotation according to this plan, are underwritten or paid for by each association when issued to it.

I claim:

1. A coupon book for use in a centralized system of partial payment subscriptions, having a series of sheets, each having means of indicating the amount of a single partial payment, and each being adapted to receive a validating mark whereupon it becomes a receipt for the payment called for thereon, a purchase agreement sheet showing the terms of agreement having a place for signature of the subscriber, being detachable from said book and marked to identify it with said book, said book containing information as to the agencies at which payments may be made.

2. A coupon book for use in a centralized system of partial payment subscriptions, having a series of sheets, each formed with a stub and a detachable coupon, each coupon having means of indicating the book or account number and the amount of a single partial payment, and each stub being adapted to receive a validating mark whereupon it becomes a receipt for the payment called for by the corresponding coupon, a purchase agreement sheet showing the terms of agreement, having a place for signature of the subscriber, being detachable from said book and marked to identify it with said book and coupons, said book containing information as to the agencies at which payments may be made.

3. A coupon book according to claim 1 in which the purchase agreement sheet is provided with a stub serving as a receipt for the amount of the initial payment.

4. A coupon book according to claim 1 in which the purchase agreement sheet is provided with a receipt for the bond or amount, the delivery of which completes the transaction.

5. A coupon book for use in a centralized system of partial payment subscriptions, having a series of sheets, each formed with a stub and a detachable coupon, each coupon having means of indicating the book or account number and the amount of a single partial payment, each stub being adapted to receive a validating mark whereupon it becomes a receipt for the payment called for by the corresponding coupon, one of said coupons containing in addition the terms of agreement, having a place for signature of the subscriber, being detachable from said book and marked to identify it with said book and coupons.

HERBERT F. RAWLL.